July 28, 1959 S. D. WILTSE 2,896,973
PIPE JOINT WITH FLEXIBLE INTERNAL SLEEVE
Filed Jan. 26, 1953 3 Sheets-Sheet 1
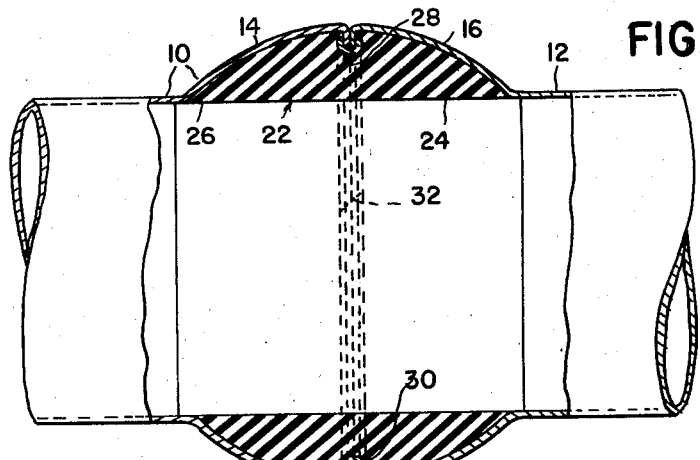
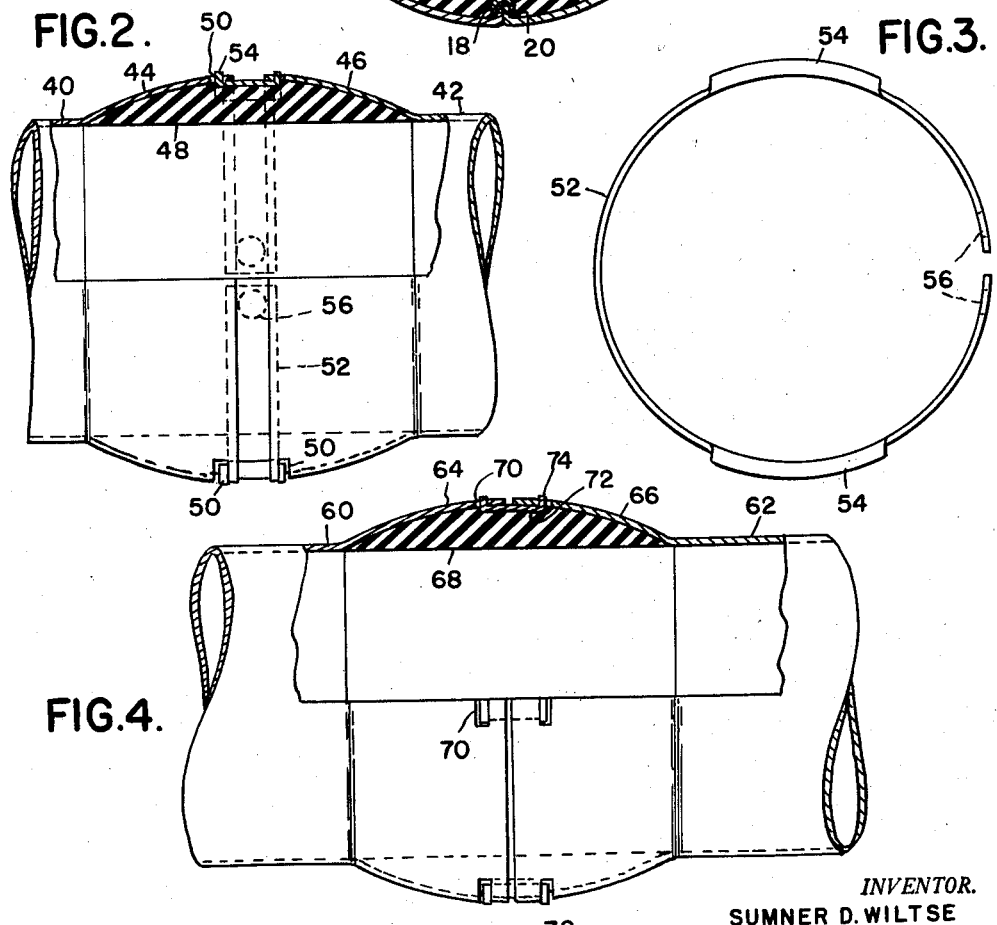
INVENTOR.
SUMNER D. WILTSE
BY Whittemore,
Hulbert & Belknap
ATTORNEYS July 28, 1959   S. D. WILTSE   2,896,973
PIPE JOINT WITH FLEXIBLE INTERNAL SLEEVE
Filed Jan. 26, 1953   3 Sheets-Sheet 2

INVENTOR.
SUMNER D. WILTSE
BY Whittemore,
Hulbert & Belknap
ATTORNEYS

FIG.8.
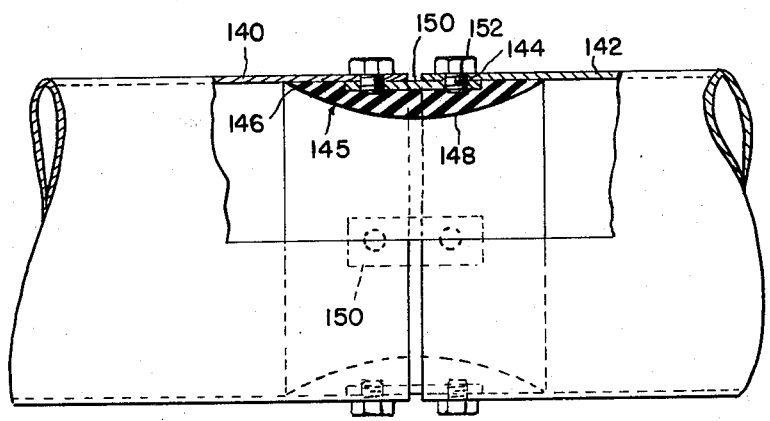
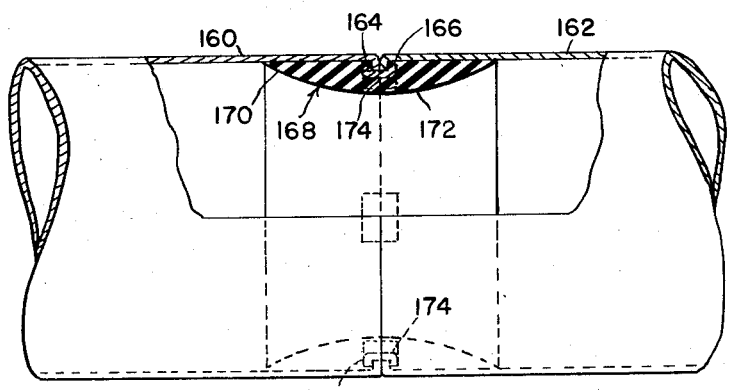
FIG.9.
*INVENTOR.*
SUMNER D. WILTSE
BY
ATTORNEYS United States Patent Office 2,896,973
Patented July 28, 1959

2,896,973

PIPE JOINT WITH FLEXIBLE INTERNAL SLEEVE

Sumner D. Wiltse, Detroit, Mich.

Application January 26, 1953, Serial No. 333,255

3 Claims. (Cl. 285—81)

The present invention relates to tube coupling construction.

It is an object of the present invention to provide a tube coupling construction characterized by its efficiency and the ease with which the parts may be assembled and disassembled.

More specifically, it is an object of the present invention to provide a tube coupling construction comprising an elongated annular sealing gasket of flexible material having end portions adapted to be received within the ends of a pair of the tubes for mechanically connecting the tubes together.

It is a further object of the present invention to provide a tube coupling construction comprising a gasket of the character described, partly received in the ends of adjacent tubes, and a rigid element extending between the ends of adjacent tubes and located inwardly thereof intermediate the inner surfaces of said tubes and the exterior surface of said gasket.

It is a further object of the present invention to provide a tube coupling construction as described in the foregoing in which the ends of the tubes have radially inwardly extending flanges, and in which the rigid element is of channel shape and is adapted to receive the flanges of the tubes therebetween.

It is a further object of the present invention to provide a construction of the character described in which the ends of the tubes are provided with aligned pairs of openings and the means mechanically connecting the tubes together includes a rigid element extending into the open ends of both tubes, and including outwardly projecting abutments receivable in the tube openings.

Other objects and features of the invention will become apparent as the description proceeds, especially when taken in conjunction with the accompanying drawings, wherein:

Figure 1 is a longitudinal section through a tube coupling constructed in accordance with the present invention.

Figure 2 is a side elevation of a similar tube coupling, partly in section.

Figure 3 is a side elevation of the coupling ring employed in the construction illustrated in Figure 2.

Figure 4 is a side elevation of a similar tube coupling, with parts in section.

Figure 4A is a detailed elevational view of one of the clips employed in the construction illustrated in Figure 4.

Figure 8 is a side elevation, partly in section, through a modified form of tube coupling.

Figure 9 is a side elevation, partly in section, through a modified form of tube coupling.

Figure 5:
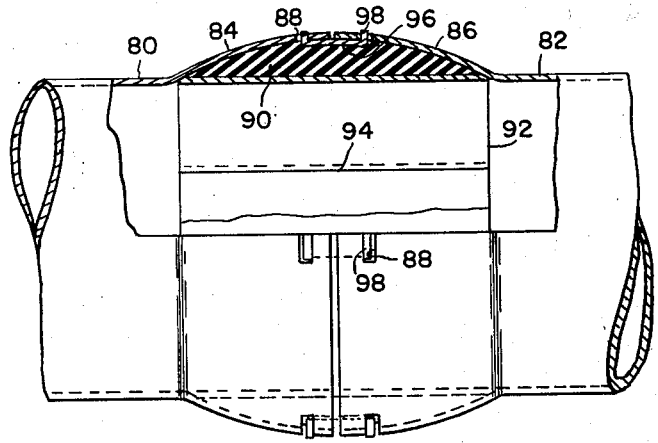
Figure 5 is a side elevation, partly in section, of a modified form of tube coupling.

Described in general terms, the several embodiments of the present invention all comprise an elongated tubular or annular sealing gasket formed of a flexible, and preferably a resilient elastic material, such for example as rubber or a rubber-like material. This material as is obvious from the detailed description below, is yieldable to provide for assembly of the several forms of couplings. The gasket preferably has a wall thickness which tapers from a relatively thick central portion to relatively thin end portions terminating preferably in substantially knife edges. The flexible knife edges of the gasket are adapted to lie against the interior surfaces of the tubes and to be pressed thereagainst by internal pressure, thereby providing an effective seal. The gaskets are shaped to conform closely to the interior surfaces of the tube ends. In some cases the tube ends are enlarged to provide spheroidal chambers, in which case the gaskets normally are provided with a cylindrical passage therethrough. In some cases the tube ends are cylindrical, in which case the gasket is provided with a gradually restricted passage, the interior surface of which is shaped to produce a Venturi effect.

In all cases, mechanical connecting means are provided for securing the ends of the tubes together and this means is in whole or in part located within the tube ends. Where the tube ends are in abutment the coupling means is located in substantial entirety within the tube ends.

The gasket may be permanently bonded to one of the tube ends, in which case the projecting end thereof may be insertable in and removable from the end of the adjacent tube. In other cases, the gasket may be permanently bonded after assembly of the coupling to both of the tube ends, thereby producing a permanent indestructible coupling. Where the gasket is formed of rubber, a bond between the rubber and the material of the tube may be produced by known procedures which is stronger than the material of the gasket itself.

Referring now to Figure 1 there is illustrated a pair of tubes 10 and 12, each of which has its end portion enlarged as indicated at 14 and 16 respectively to provide spheroidal chambers. The ends of the tubes are shaped to provide inwardly extending radial flanges 18 and 20 respectively. Located within the spheroidal portions of the tubes is a gasket 22 having an internal cylindrical passage 24 preferably of the same diameter as the internal diameter of the tubes 10 and 12. The gasket 22 is of maximum thickness intermediate its ends and tapers to substantially knife edged end portions indicated at 26. The gasket is provided at its exterior surface with an annular groove 28 which receives the flanges 18 and 20, and a coupling member 30. The coupling member 30 is in the present instance provided in the form of a split ring, the ends thereof being indicated at 32. The ring 30 is of outwardly facing U-shaped channel formation and is adapted to embrace the inwardly extending flanges 18 and 20. In this instance the flanges 18 and 20 are in abutment and the transverse dimension of the channel of the ring 30 is such as to embrace the flanges tightly to retain the tubes in assembled relation. However, the coupling may be broken by forcing a thin blade between the flanges 18 and 20 and depressing one end portion of the tube, after which it may be worked free from the flanges, thus permitting separation between the tubes.

Referring now to Figures 2 and 3 there is illustrated a pair of tubes 40 and 42 having spheroidally enlarged end portions 44 and 46 respectively. Located within the enlarged end portions of the tubes is a gasket 48 which may be generally similar to the gasket 22 previously decribed. The ends of the tubes 40 and 42 are provided with circumferentially extending slots 50 which in this instance are illustrated as two in number. Received within the tube ends and between the inner surfaces of the tube ends and the outer surface of the gasket 48 is a split ring 52 bent as seen in Figure 3. The split ring is provided with a plurality of outwardly extending ears or flanges 54 adapted to fit within the slots 50. In the present instance the split ring 52 is of substantial width so that the ears 54 enter the slot 50 when the ends of the tubes are substantially spaced, as best illustrated in Figure 2. This exposes an intermediate portion of the split ring 52. Preferably, the split ring is provided with a pair of openings 56 adjacent its ends, which may be engaged by a tool so as to contract the ring and to withdraw the ears 54 from the slots 50 to permit disassembly of the joint or coupling.

Referring now to Figures 4 and 4A there is illustrated a pair of tubes 60 and 62 having spheroidally enlarged end portions 64 and 66. Received within the spheroidal enlargements 64 and 66 is a gasket 68 which may be substantially identical with the gasket 48 described in conjunction with Figure 2. The end portions of the tubes are provided with circumferentially extending slots 70 and the mechanical coupling means in this instance takes the form of separate clips 72, one of which is shown in detail in Figure 4A. The clips 72 are provided with flanges or ears 74 adapted to extend through the openings 70 to effect a mechanical coupling between the tubes 60 and 62. In this instance the clips are dimensioned to engage in the slots 70 when the ends of the tubes are slightly spaced, as well illustrated in Figure 4, so that the coupling may be disassembled by pressing a blade inwardly against the clips 72 to disengage the ears 74 from the slots 70.

Referring now to Figure 5 there is illustrated a pair of tubes 80 and 82 which are illustrated as having spheroidally enlarged end portions 84 and 86 and these in turn are provided with circumferentially extending slots 88. The coupling includes a gasket 90 shaped to conform to the interior surface of the spheroidal enlargements 84 and 86 but of somewhat less thickness than the gasket 68 illustrated in Figure 4. Located within the gasket 90 is a split cylindrical sleeve 92 the ends of which are indicated at 94. The sleeve 92 may be formed of thin metal and serves to protect the interior surface of the gasket 90. Preferably, the internal diameter of the sleeve 92 in the assembled relation is the same as the internal diameter of the tubes 80 and 82. Mechanical coupling between the tubes 80 and 82 is accomplished by clips 96 having outwardly projecting ears 98 extending into the openings 88 formed adjacent the ends of the tubes.

Figure 6:
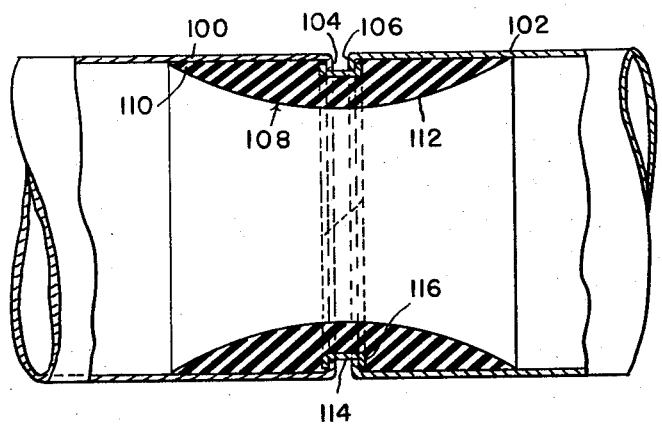
Figure 6 is a longitudinal sectional view through a modified form of tube coupling.

Referring now to Figure 6 there is illustrated a pair of tubes 100 and 102 which are cylindrical throughout their length and are provided at their adjacent end portions with inwardly extending portions 104 and 106. A gasket 108 is provided having a relatively thick central portion and tapering to relatively thin end potrions, as indicated at 110. The outer surface of the gasket 108 is cylindrical and is dimensioned to fit closely within the interior surfaces of the tubes 100 and 102. Inasmuch as the end portions of the tubes are not enlarged, the passage through the gasket 108 is of a restrictive Venturi form as illustrated at 112.

Mechanical connection between tubes 100 and 102 is accomplished by a split ring 114 having outwardly extending flanges 116 adapted to embrace and engage the flanges 104 and 106 of the tubes. It will be observed that the ring 114 is of substantially axial extent so that in assembly the flanges 104 and 106 are spaced apart to expose the intermediate portion of the split ring 114, thus affording access to the split ring to permit displacement thereof and disengagement from the flanges 104 and 106.

Figure 7:
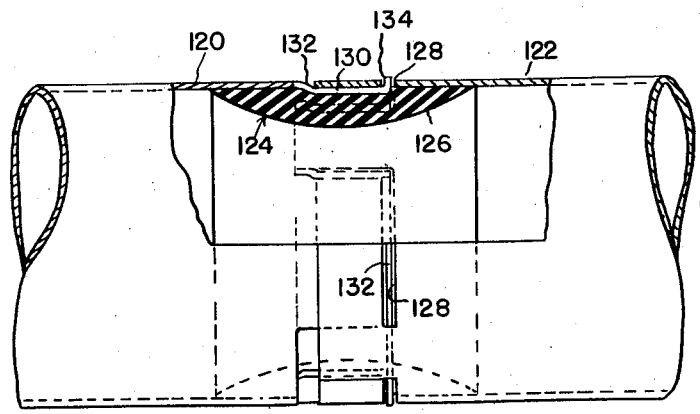
Figure 7 is a side elevation, partly in section, through a modified form of tube coupling.

Referring now to Figure 7 there is illustrated a pair of tubes 120 and 122. Associated with the tubes is a sealing gasket 124 having an external cylindrical shape and having a passage therethrough of Venturi configuration, as illustrated at 126. Adjacent the ends of the tube 122 are a plurality of circumferentially extending and circumferentially spaced slots 128. The tube 120 is shaped at its adjacent end to provide a plurality of axially or longitudinally extending resilient fingers 130 which are bent inwardly as indicated at 132 to extend within the adjacent end of the tube 122. At the outer ends of the fingers 130 there are provided outwardly extending ears or flanges 134 which are adapted to be received within the slots 128 to effect a mechanical connection between the ends of the tubes.

Referring now to Figure 8 there is illustrated a pair of tubes 140 and 142 which are provided adjacent their ends with openings 144. Partially received within the adjacent ends of the tubes 140 and 142 is a sealing gasket 145 having an external cylindrical configuration adapted to fit closely within the inner surfaces of the tubes 140 and 142. The gasket 145 has relatively thin tapered ends as indicated at 146, and the passage 148 extending therethrough is of centrally reduced cross-section to produce a Venturi effect.

Mechanical coupling between the tubes 140 and 142 is effected by a plurailty of straps 150 having threaded openings adjacent their ends adapted to receive threaded portions of bolts 152 which extend through the openings 144 of the tubes.

Referring now to Figure 9 there is illustrated a pair of tubes 160 and 162 having inwardly extending flanges 164 and 166 at the ends thereof. Received within the adjacent ends of the tubes is a gasket 168 which is of tapered cross-section as illustrated to provide relatively thin end portions 170 and a Venturi-like passage 172 therethrough. The exterior surface of the gasket 168 is preferably provided with a groove to receive the flanges 164 and 166 and the coupling clips which connect the flanges. These coupling clips are illustrated at 174 and include outwardly extending flanges 176 adapted to embrace the flanges 164 and 166.

The drawings and the foregoing specification constitute a description of the improved flexible tube coupling in such full, clear, concise and exact terms as to enable any person skilled in the art to practice the invention, the scope of which is indicated by the appended claims.

What I claim as my invention is:

1. Tube coupling construction comprising a pair of aligned rigid tubes having end portions provided with radially inwardly extending abutted flange portions at the ends thereof, a connecting and sealing gasket of annular shape extending into the adjacent end portions of said tubes, said gasket having end portions of tapered wall thickness defined by inner and outer surfaces converging toward its ends to form thin flexible sealing lips, one of said surfaces being cylindrical, the other of said surfaces being smoothly convexly curved in axial section, the outer surface of said gasket having an annular groove intermediate its ends, the portions of said gasket at opposite sides of said groove fitting snugly within the inner surfaces of the end portions of said tubes, said inwardly extending flange portions being received in said groove and being in abutment with each other, the material of said gasket being sufficiently yieldable and resilient to provide for movement of said inwardly extending flange portions over the end portions of said gasket into said groove and return of the material adjacent said groove into engagement with the inner surfaces of said inwardly extending flange portions to prevent relative separation between said inwardly extending flange portions, and rigid coupling means located within the end portions of said tubes and between the inner surfaces of said tubes and the outer surface of said gasket, said coupling means being constructed to provide for the application of pressure developed within said gasket to the inner sides of said flange portions, the inner surface of said gasket defining a flow passage of a size sufficient to provide for substantially unrestricted fluid flow therethrough, the tapered wall thickness of the end portions of said gasket and the interfitting relation between the end portions of the tubes and gasket being effective to develop balanced forces within the material of said gasket as a result of pressure of fluid acting against the inner surface of said gasket which assist said gasket in holding said inwardly extending flange portions against relative separation.

2. A construction as defined in claim 1 in which said coupling means comprises a plurality of U-shaped clips having legs engaging the inner sides of said flange portions at circumferentially spaced points.

3. A construction as defined in claim 1 in which the inner surface of said gasket is smoothly convexly curved in axial section.

References Cited in the file of this patent

UNITED STATES PATENTS

| | | |
|---|---|---|
| 406,683 | White | July 9, 1889 |
| 465,617 | Lynch | Dec. 22, 1891 |
| 617,728 | Farrey | Jan. 17, 1899 |
| 718,599 | Bubb | Jan. 20, 1903 |
| 931,581 | Doyle | Aug. 17, 1909 |
| 1,273,896 | Martin | July 30, 1918 |
| 1,561,033 | Spencer | Nov. 10, 1925 |
| 1,684,516 | Roach | Sept. 18, 1928 |
| 2,014,313 | Damsel | Sept. 10, 1935 |
| 2,168,631 | Scott | Aug. 8, 1939 |
| 2,270,089 | Stout | Jan. 13, 1942 |
| 2,517,290 | De Moude et al. | Aug. 1, 1950 |
| 2,650,115 | Taylor | Aug. 25, 1953 |

FOREIGN PATENTS

| | | |
|---|---|---|
| 155,606 | Great Britain | Dec. 30, 1920 |